United States Patent
Shinoda et al.

(10) Patent No.: US 10,189,131 B2
(45) Date of Patent: Jan. 29, 2019

(54) MOTOR CONTROL DEVICE FOR MACHINE TOOL HAVING PLURALITY OF AXES

(71) Applicant: FANUC CORPORATION, Yamanashi (JP)

(72) Inventors: Shougo Shinoda, Yamanashi (JP); Satoshi Ikai, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/728,926

(22) Filed: Oct. 10, 2017

(65) Prior Publication Data
US 2018/0104780 A1 Apr. 19, 2018

(30) Foreign Application Priority Data
Oct. 13, 2016 (JP) .................. 2016-201755

(51) Int. Cl.
*H02P 29/028* (2016.01)
*B23Q 5/10* (2006.01)
(Continued)

(52) U.S. Cl.
CPC .............. *B23Q 5/10* (2013.01); *B23Q 5/02* (2013.01); *B23Q 5/22* (2013.01); *B23Q 5/58* (2013.01);
(Continued)

(58) Field of Classification Search
CPC ...... H02P 1/00; H02P 3/00; H02P 3/04; H02P 3/06; H02P 3/065; H02P 3/18; H02P 5/46; H02P 6/006; H02P 6/008; H02P 8/24; H02P 23/00; H02P 25/021; H02P 25/04; H02P 25/06; H02P 25/14; H02P 29/025; H02P 31/00; H02P 2005/00; H02P 2005/4002; H02P 2005/4007; H02P 29/028; H02P 2007/00; H02P 6/00; H02P 2007/67; H02P 2006/00; G05B 11/01; G05B 13/00
(Continued)

(56) References Cited

U.S. PATENT DOCUMENTS

2014/0103853 A1* 4/2014 Yoshida .................. H02P 29/02
318/563

FOREIGN PATENT DOCUMENTS

JP 5138500 A 6/1993
JP 2003169497 A 6/2003
(Continued)

*Primary Examiner* — Antony M Paul
(74) *Attorney, Agent, or Firm* — RatnerPrestia

(57) ABSTRACT

A motor control device for a machine tool having a plurality of axes includes a plurality of motor control units that control motors; an abnormality detection unit provided for at least one of the motor control units and configured to output an abnormality detection signal upon detecting an abnormality with respect to the axis driven by the motor controlled by the motor control unit provided with the abnormality detection unit; a safety operation control unit provided for a motor control unit that is not the motor control unit provided with the abnormality detection unit, the safety operation control unit configured to control the motor upon receiving the abnormality detection signal in such a way that the tool comes out of contact with the workpiece; and a communication unit that transmits the abnormality detection signal outputted by the abnormality detection unit to the safety operation control unit.

5 Claims, 2 Drawing Sheets

(51) Int. Cl.
*B23Q 5/58* (2006.01)
*G05B 19/4063* (2006.01)
*G05B 19/416* (2006.01)
*H02P 3/02* (2006.01)
*B23Q 5/02* (2006.01)
*B23Q 5/22* (2006.01)
*B23Q 11/00* (2006.01)
*B23Q 17/09* (2006.01)
*G05B 19/414* (2006.01)
*H02P 6/04* (2016.01)

(52) U.S. Cl.
CPC ...... *B23Q 11/0085* (2013.01); *B23Q 17/0952* (2013.01); *G05B 19/4063* (2013.01); *G05B 19/416* (2013.01); *H02P 3/025* (2013.01); *G05B 19/4148* (2013.01); *H02P 6/04* (2013.01)

(58) Field of Classification Search
USPC .......... 318/400.01, 700, 701, 264, 727, 799, 318/430, 560, 561; 409/254, 255, 134; 361/1, 23, 30; 700/143; 324/500, 512; 701/31.7, 31.8; 702/58, 59; 340/532
See application file for complete search history.

(56) References Cited

FOREIGN PATENT DOCUMENTS

JP 2005-176493 A 6/2005
WO 2012176268 A1 12/2012

\* cited by examiner

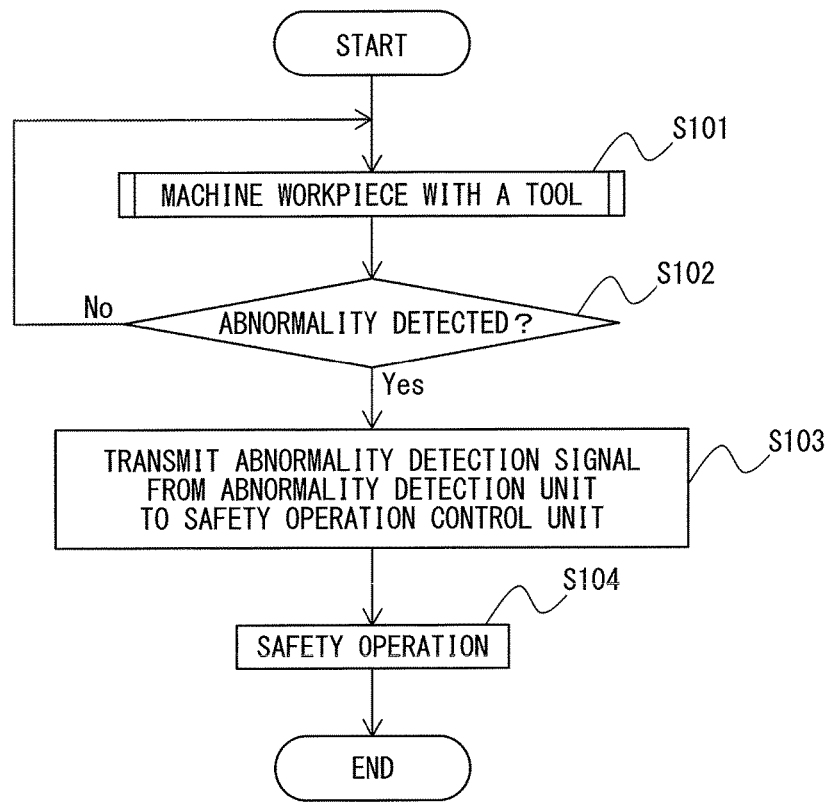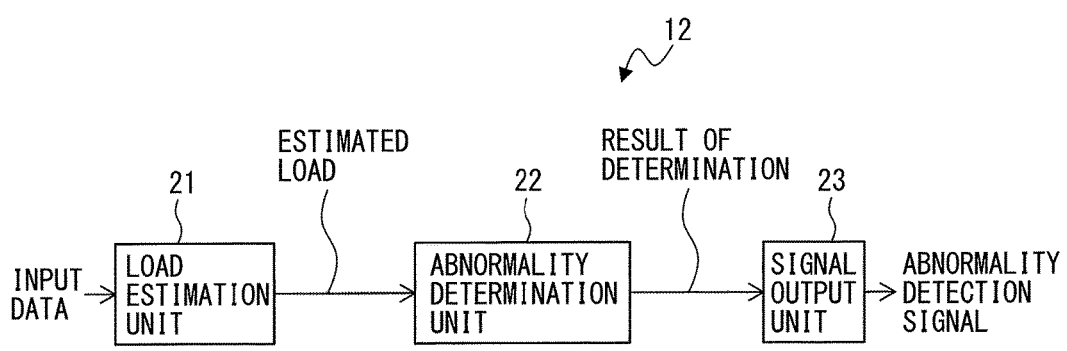

MOTOR CONTROL DEVICE FOR MACHINE TOOL HAVING PLURALITY OF AXES

BACKGROUND OF THE INVENTION

1. Field of the Invention

The present invention relates to a motor control device for a machine tool equipped with a plurality of axes for machining a workpiece with a tool.

2. Description of the Related Art

A motor in a machine tool is used as a drive source for driving an axis to which a tool or a workpiece is attached. In a machine tool provided with a plurality of axes for controlling a tool and a workpiece by separate axes, for example, when an abnormal load is applied between the tool and the workpiece, the workpiece and the tool may be broken or deformed, or even the machine tool itself or the production line that includes the machine tool may fail. To address this, when an abnormal load is applied between a tool and a workpiece, an operation is performed to evacuate (pull away) the tool to a safe position from which the tool does not contact the workpiece (this operation may be hereinafter referred to simply as "safety operation").

As disclosed in Japanese Unexamined Patent Publication (Kokai) No. 2005-176493, for example, a technique is known such that, in a machine having two axes mechanically connected, a drive device in which an abnormality has occurred transmits a piece of state information to the controller and the other drive device in which no abnormality has occurred, and the drive device in which an abnormality has occurred is brought to a halt in accordance with a certain preset deceleration procedure while the drive device in which no abnormality has occurred is brought to a halt in accordance with a deceleration procedure on the basis of the state information of the drive device in which an abnormality has occurred.

In a machine tool provided with a plurality of axes for controlling a tool and a workpiece by separate axes, conventionally, the load applied between the tool and the workpiece is detected as a load on the motor by a load monitoring unit provided for the motor.

However, when there is a coupling mechanism between the axis to which the tool is attached and the motor, such as a ball screw, a coupling joint, or a decelerator, it takes time for an abnormality that has occurred in the tool to be transmitted through the coupling mechanism to reach the motor. In other words, there is a time lag between the an abnormal load on the tool and its detection by the load monitoring unit provided for the motor, and consequently the safety operation based on the basis of the result of detection by the load monitoring unit is started with a considerable delay after the occurrence of the abnormal load. Such a delayed safety operation may not move the tool away from the workpiece, and the workpiece and the tool may be broken or deformed, or the machine tool or the production line that includes the machine tool may fail.

In addition, when there is a coupling mechanism between the axis and the motor, forces such as friction from the coupling mechanism is applied on the motor; therefore, the load monitored by the load monitoring unit provided for the motor connected with the axis by a coupling mechanism is not an accurate indication of the load between a tool and a workpiece. An inaccurate detection result by the load monitoring unit may lead to an error in the safety operation.

SUMMARY OF INVENTION

For a machine tool equipped with a plurality of axes for machining a workpiece with a tool, a motor control device is desired that swiftly ensures a safe state in which the workpiece and the tool do not come in contact with each other when an abnormality has occurred.

According to an aspect of the present disclosure, a motor control device for a machine tool equipped with a plurality of axes for machining a workpiece with a tool includes: a plurality of motor control units that respectively control motors respectively provided for driving the axes; an abnormality detection unit provided for at least one of the motor control units and configured to output an abnormality detection signal upon detecting an abnormality with respect to the axis driven by the motor controlled by the motor control unit provided with the abnormality detection unit; a safety operation control unit provided for a motor control unit that is not the motor control unit provided with the abnormality detection unit, the safety operation control unit configured to, upon receiving the abnormality detection signal, control the motor that drives the axis provided with the tool in such a way that the tool comes out of contact with the workpiece; and a communication unit for communication between the motor control units that transmits the abnormality detection signal outputted by the abnormality detection unit to the safety operation control unit.

Herein, the abnormality detection unit may be provided for the motor control unit that controls a direct drive motor or a linear motor.

Further, the motor control units may be provided independently of a numerical control unit that generates a command for driving the axes of the machine tool in accordance with a machining program.

Further, each of the plurality of motor control units may be provided with an abnormality detection unit, and the safety operation control unit may be configured to control the motor that drives the axis provided with the tool in such a way that the tool comes out of contact with the workpiece based on an earliest abnormality detection signal outputted by any of the plurality of abnormality detection units.

Further, each abnormality detection unit may include a load estimation unit that estimates a load on the motor controlled by the motor control unit provided with the abnormality detection unit, an abnormality determination unit that determines that an abnormality has occurred with respect to the axis driven by the motor controlled by the motor control unit provided with the abnormality detection unit when the load estimated by the load estimation unit exceeds a certain threshold value, and a signal output unit that outputs an abnormality detection signal when the abnormality determination unit determines that an abnormality has occurred.

BRIEF DESCRIPTION OF THE DRAWINGS

The present invention will be more clearly understood with reference to the following accompanying drawings:

FIG. 2 is a flow chart illustrating a procedure concerning a safety operation of the motor control device for the machine tool according to an embodiment of the present disclosure; and FIG. 3 is a block diagram illustrating an example of an abnormality detection unit in the motor control device for the machine tool according to an embodiment of the present disclosure.

DETAILED DESCRIPTION

Figure 1:
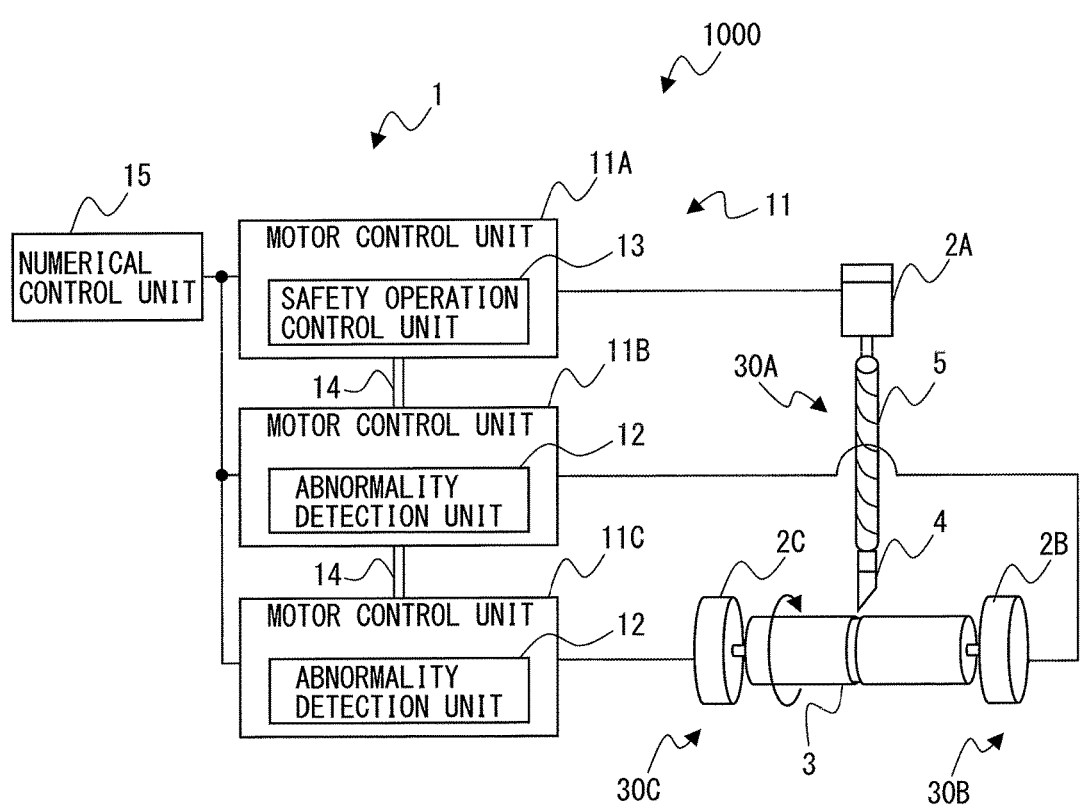
FIG. 1 is a diagram illustrating a motor control device for a machine tool according to an embodiment of the present disclosure.

Next, an embodiment of the present disclosure will be described with reference to the attached drawings. In the drawings referred to below, like members are denoted by like reference numerals. The drawings are presented in various scales to aid the readers' understanding. The drawings merely represent an example embodiment of an aspect of the present disclosure, which may take other forms of embodiment.

FIG. 1 is a diagram illustrating a motor control device for a machine tool according to an embodiment of the present disclosure. Hereinbelow, constituent features denoted by like reference numerals in different drawings are to be understood to have the same functions.

In machine tools generally, motors are respectively provided for axes to which tools and workpieces are attached. The machine tool to which a motor control device according to an embodiment of the present disclosure is applied is preferably a machine that causes a tool 4 to contact a workpiece 3 approximately in one direction, such as a lathe or a grinder. As an example, a machine tool 1000 that machines a workpiece 3 attached to workpiece axes 30B and 30C with a tool 4 attached to a tool axis 30A will be described here. Hereinbelow, the tool axis 30A and the workpiece axes 30B and 30C may be referred to simply as "axis". A servo motor 2A is provided as a driving source for the tool axis 30A. A coupling mechanism 5 such as a ball screw, a coupling joint, or a decelerator is provided between the servo motor 2A and the tool 4. Direct drive motors 2B and 2C are provided as driving sources for the workpiece axes 30B and 30C.

According to an embodiment of the present disclosure, a motor control device 1 for a machine tool 1000 that machines a workpiece 3 with a tool 4 by means of axes 30A, 30B, and 30C includes a plurality of motor control units 11A, 11B, and 11C, an abnormality detection unit 12, a safety operation control unit 13, and communication units 14.

A motor control unit 11A is provided to control the servo motor 2A, and motor control units 11B and 11C are respectively provided to control the direct drive motors 2B and 2C. The reference numerals for the motor control units 11A, 11B, and 11C may be collectively written as 11 hereinbelow. The motor control units 11 include main circuit systems (not illustrated) to supply the motors 2A, 2B, and 2C with driving power and control systems (not illustrated) to control the operation of the motors 2A, 2B, and 2C.

The main circuit systems of the motor control units 11 each include, for example, a rectifier (not illustrated) that converts the AC power supplied by an AC power supply (not illustrated) to a DC power and outputs the DC power to a DC link, and an inverter (not illustrated) that is connected to the DC link and converts the DC power in the DC link to an AC power to supply the AC power to the motors 2A, 2B, and 2C. The rectifier to be used is not limited to a particular embodiment and may be, for example, a diode rectifier or a PWM controlled rectifier. Further, the inverter is not limited to a particular embodiment and is generally a power converter capable of bidirectional conversion between AC power and DC power, for example, a PWM inverter. A PWM inverter consists of a bridge circuit including a switching device and a diode in anti-parallel connection therewith, and the switching operation of the switching device is PWM controlled in accordance with a drive command generated in the control system of the motor control unit 11. Examples of a switching device include an IGBT, a thyristor, a GTO (Gate Turn-OFF thyristor), a transistor, but the type of semiconductor switching device is not limited in the present embodiment and may be any other type of semiconductor switching device. The inverter in the motor control unit 11, by causing a switching operation of the switching device inside the motor control unit 11 in accordance with a drive command received from the control system in the motor control unit 11, converts the DC power supplied from the DC link to an AC power of desired voltage and desired frequency for driving motors 2A, 2B, and 2C. This causes the motors 2A, 2B, and 2C to operate in accordance with the supplied AC power of variable voltage and variable frequency.

In accordance with commands from a numerical control unit 15, the control systems of the motor control units 11A, 11B, and 11C respectively generate switching commands to control the switching operations of the switching devices in the inverters included in the main circuit systems of the motor control units 11A, 11B, and 11C. The motor control units 11A, 11B, and 11C are provided independently of the numerical control unit 15, which generates commands to drive the axes 2A, 2B, and 2C of the machine tool 1000 in accordance with a machining program.

The numerical control unit 15 generates commands to machine the workpiece 3 attached to the workpiece axes 30B and 30C with the tool 4 attached to the tool axis 30A in accordance with a certain machining program. The machining program contains command processing information for the machine tool 1000 to perform a certain task. The machining program includes information such as, for example, an operation command to move the tool 4 to the workpiece 3 by means of the servo motor 2A, an operation command to rotate the workpiece 3 by means of the direct drive motors 2B and 2C, a command to send a signal to the outside, and a command to read the state of a signal. The machining program may also include information on the position of the tool 4 relative to the workpiece 3 and numbers of operation signals. It goes without saying that any command that can be registered in the program may be included. In other words, the programming information in the present embodiment is not limited to the programming information described herein by examples. The commands generated by the numerical control unit 15 are sent to the motor control units 11A, 11B, and 11C.

At least one of the motor control units is provided with an abnormality detection unit 12, which outputs an abnormality detection signal upon detecting an abnormality with respect to the axis driven by the motor controlled by the motor control unit provided with the abnormality detection unit 12. The abnormality detection unit 12 is provided for a motor control unit controlling a direct drive motor or a linear motor. The abnormality detection unit 12 is provided far a motor control unit controlling a direct drive motor or a linear motor for the following reason. A direct drive motor or a linear motor employs almost no coupling mechanism such as a ball screw, a coupling joint, or a decelerator, and hence an axis driven by a direct drive motor or a linear motor is little affected by external factors except for the contact of the tool and the workpiece; and when an abnormal load is applied to the axis, the abnormal load reaches the direct drive motor or the linear motor in a much shorter period (for example, 1 to 2 milliseconds) compared with a motor employing a coupling mechanism. In the present embodiment, therefore, an abnormality detection unit 12 is provided for a motor control unit controlling a direct drive motor or a linear motor to shorten the period for detecting an abnormal load after the occurrence of the abnormal load, compared with the conventional technique. In the example illustrated in the drawing, the motor control units 11B and 11C controlling the direct drive motors 2B and 2C are provided with abnormality detection units 12. Either abnormality detection unit 12 outputs an abnormality detection signal upon detecting an abnormality with respect to one of the axes 30B and 30C, driven by the direct drive motors 2B and 2C controlled by the motor control units 11B and 11C.

The safety operation control unit 13 is provided for a motor control unit that is not one of the motor control units provided with the abnormality detection units 12 and, upon receiving an abnormality detection signal, controls the motor that drives the axis provided with the tool in such a way that the tool comes out of contact with the workpiece. In the example illustrated in the drawing, since the abnormality detection units 12 are provided for the motor control units 11B and 11C, the safety operation control unit 13 is provided for the motor control unit 11A, which is not one of these motor control units and drives a servo motor 2A. Upon receiving an abnormality detection signal, the safety operation control unit 13 controls the servo motor 2A that drives the tool axis 30A provided with the tool 4 to perform a safety operation such that the tool 4 is pulled away from the workpiece 3 to a safe position from which the tool 4 is no longer in contact with the workpiece 3. The machine tool 1000, which is a lathe, a grinder, or the like, causes the tool 4 to contact the workpiece 3 approximately in one direction, and hence, at a time of an abnormal load, the interference between the tool 4 and the workpiece 3 occurs also approximately in one direction. As a safety operation for avoiding such an interference, the tool 4 may be pulled away from the workpiece 3, for example, by tens of millimeters. The safety operation control unit 13 inside the servo motor control unit 11A is provided with an operation program with a preset parameter, such as described above, to stipulate an extent to which the tool 4 is to be pulled away and, upon receiving an abnormality detection signal, the safety operation control unit 13 controls the servo motor 2A to perform a safety operation in accordance with the operation program.

The communication units 14 are provided for the purpose of communication between the control systems of the motor control units 11A, 11B, and 11C. An abnormality detection signal outputted by the abnormality detection unit 12 of one of the motor control units 11B and 11C is transmitted via a communication unit 14 to the safety operation control unit 13 in the motor control unit 11A. As described above, the numerical control unit 15 is provided independently of the motor control units 11A, 11B, and 11C, and the abnormality detection signal outputted by the abnormality detection unit 12 in the motor control unit 11B or 11C is transmitted to the safety operation control unit 13 in the motor control unit 11A without passing through the numerical control unit 15. A communication between the motor control units 11A, 11B, and 11C via the numerical control unit 15 would take, for example, 4 to 8 milliseconds of signal transmission time whereas in the present embodiment the motor control units 11A, 11B, and 11C directly communicate with one another via the communication units 14, which only takes a very short signal transmission time, for example 1 to 2 milliseconds, which enables a further reduction of the time to be spent before starting a safety operation after detecting an abnormal load.

When the control systems of the motor control units 11A, 11B, and 11C are realized by one DSP (Digital Signal Processor), the communication units 14 connecting the motor control units 11A, 11B, and 11C may be realized as one of the digital data processing functions of the DSP. When the control systems of the motor control units 11A, 11B, and 11C are realized by separate DSPs (three DSPs in the example illustrated in the drawing) the communication units 14 connecting the motor control units 11A, 11B, and 11C may be realized by digital data communication between the DSPs. In either case, high speed communication is achieved between the motor control units 11A, 11B, and 11C via communication units 14. The digital data communication inside the DSP or between the DSPs can be done at a high speed, albeit with a small channel capacity, whereas the communication between the numerical control unit 15 and DSPs (motor control units 11) is suitable for a communication conducted at a speed not so fast but with a large channel capacity.

A plurality of motor control units 11 (i.e. 11B and 11C) are respectively provided with abnormality detection units 12 in the example illustrated in the drawing, but a single motor control unit may be provided with an abnormality detection unit 12. Note that, by providing a plurality of motor control units 11 with abnormality detection units 12 as in the example illustrated in the drawing, the safety operation control unit 13 can control the servo motor 2A that drives the tool axis 30A provided with the tool 4 in such a way that the tool 4 comes out of contact with the workpiece 3 on the basis of an earliest abnormality detection signal outputted by any of the plurality of abnormality detection units 12, which enables a further reduction of the time to be spent before starting a safety operation after detecting an abnormal load. In other words, when there are a plurality of motor control units controlling direct drive motors (or linear motors) that do not employ a coupling mechanism such as a ball screw, a coupling joint, or a decelerator, an early detection of an abnormal load is achieved by monitoring for an abnormal load on of the axes by the abnormality detection units 12 respectively provided for the motor control units, which enables a further reduction of the time to be spent before starting a safety operation after detecting an abnormal load.

As described above, according to an embodiment of the present disclosure, the abnormality detection units 12 are provided for the motor control units 11B and 11C that control the direct drive motors 2B and 2C, which do not employ a coupling mechanism 5 such as a ball screw, a coupling joint, or a decelerator, and the abnormality detection units 12 monitor for an abnormal load on the axes driven by the direct drive motors 2B and 2C, which enables a reduction of the time for detecting an abnormal load after the occurrence of the abnormal load as well as an accurate detection of the state of the load. Further, an abnormality detection signal is outputted based on the accurate result of the detection by the abnormality detection unit 12 and transmitted to the safety operation control unit 13 provided for the motor control unit 11A not via the numerical control unit 15 but via the communication units 14 connecting the motor control units 11, which enables a further reduction of the time to be spent before starting a safety operation after the abnormal load detection and lowers the chance of an error in the operation. Since the safety operation is started soon after the abnormal load detection, it is possible to prevent the workpiece and the tool from being broken or deformed and to prevent the failure of the machine tool itself or the production line that includes the machine tool. As the chance of an error in the safety operation is low, efficient workpiece machining can be achieved.

In the above-described embodiment the motor control units 11 provided with the abnormality detection units 12 control direct drive motors, but they may control linear motors.

FIG. 2 is a flow chart illustrating a procedure concerning a safety operation of the motor control device for the machine tool according to an embodiment of the present disclosure.

Starting from a state in which the machine tool 1000 is machining the workpiece 3 attached to the workpiece axes 30B and 30C with the tool 4 attached to the tool axis 30A (Step S101), in Step S102, the abnormality detection units 12 provided for the motor control units 11B and 11C determine whether or not an abnormality has been detected with respect to either of the axes 30B and 30C driven by the direct drive motors 2B and 2C controlled by the motor control units 11B and 11C. The process returns to Step S101 when no abnormality detection signal has been detected in Step S102, whereas the process proceeds to Step S103 when an abnormality detection signal has been detected.

In Step S103, one of the abnormality detection units 12 outputs an abnormality detection signal and transmits the abnormality detection signal to the safety operation control unit 13 via the communication units 14.

In Step S104, the safety operation control unit 13 in the motor control unit 11A controls the servo motor 2A that drives the tool axis 30A to which the tool 4 is attached to perform a safety operation such that the tool 4 is pulled away from the workpiece 3 to a safe position from which the tool 4 is no longer in contact with the workpiece 3.

FIG. 3 is a block diagram illustrating an example of an abnormality detection unit in the motor control device for the machine tool according to an embodiment of the present disclosure.

Each abnormality detection unit 12 for detecting an abnormal load on the axis includes: a load estimation unit 21 that estimates a load on the motor (direct drive motor 2B or 2C in the example in FIG. 1) controlled by the motor control unit (reference numeral 11B or 11C in the example in FIG. 1) provided with the abnormality detection unit 12; an abnormality determination unit 22 that determines that an abnormality has occurred with respect to the axis driven by the motor controlled by the motor control unit provided with the abnormality detection unit 12 when the load estimated by the load estimation unit 21 exceeds a certain threshold value; and a signal output unit 23 that outputs an abnormality detection signal when the abnormality determination unit 22 determines that an abnormality has occurred. Note that the load estimation by the load estimation unit 21 may be according to known methods, such as a method in which an observer circuit is provided and the load is estimated based on two inputs consisting of an actual motor speed and a torque command, and a method in which the load is estimated based on two inputs consisting of a torque command and a result of torque measurement by a torque measuring instrument.

In the above-described embodiment, the safety operation by the safety operation control unit 13 is started based on an abnormal load detected by one of the abnormality detection units 12 whereas, as a modification of this, a safety operation by the safety operation control unit 13 may be started based on an alarm signal indicating an abnormality that is not an abnormal load.

The above-described abnormality detection units 12 (each including a load estimation unit 21, an abnormality determination unit 22, and a signal output unit 23) and the safety operation control unit 13 may be constituted by, for example, a software program or may be constituted by a combination of electronic circuits, which may be of various kinds, and a software program. When these are constituted by, for example, a software program, the software program is installed in the DSPs constituting the control systems of the motor control units 11 and arithmetic processing units (not illustrated) in the DSPs operate in accordance with the software program stored in storage units to realize the functions of the aforementioned units. Alternatively, the abnormality detection units 12 (each including a load estimation unit 21, an abnormality determination unit 22, and a signal output unit 23) and the safety operation control unit 13 may be realized as semiconductor integrated circuits in which the software programs to realize the functions of these units are written and, in this case, the functions of these units are realized by incorporating the semiconductor integrated circuits in existing motor control units.

According to an aspect of the present disclosure, a motor control device is achieved that swiftly ensures a safe state in which the workpiece and the tool do not contact with each other when an abnormality has occurred in a machine tool equipped with a plurality of axes for machining a workpiece with a tool.

According to an aspect of the present disclosure, an abnormality detection unit is provided for a motor control unit controlling a direct drive motor or a linear motor employing no coupling mechanism such as a ball screw, a coupling joint, or a decelerator, and the abnormality detection unit monitors for an abnormal load on the axis driven by the direct drive motor or the linear motor, which enables a reduction of the time for detecting an abnormal load after the occurrence of the abnormal load as well as an accurate detection of the state of the load. Further, an abnormality detection signal is outputted based on the accurate result of the detection by the abnormality detection unit and transmitted to the safety operation control unit provided for another motor control unit not via a numerical control unit but via communication units connecting the motor control units, which enables a further reduction of the time to be spent before starting a safety operation after the abnormal load detection and lowers the chance of an error in the operation. Since the safety operation is started soon after the abnormal load detection, it is possible to prevent the workpiece and the tool from being broken or deformed and to prevent the failure of the machine tool itself or the production line that includes the machine tool. As the chance of an error in the safety operation is low, efficient workpiece machining can be achieved.

What is claimed is:

1. A motor control device for a machine tool equipped with a plurality of axes for machining a workpiece with a tool, the device comprising:
   a plurality of motor control units that respectively control motors respectively provided for driving the axes;
   an abnormality detection unit provided for at least one of the motor control units and configured to output an abnormality detection signal upon detecting an abnormality with respect to the axis driven by the motor controlled by the motor control unit provided with the abnormality detection unit;
   a safety operation control unit provided for a motor control unit that is not the motor control unit provided with the abnormality detection unit, the safety operation control unit configured to, upon receiving the abnormality detection signal, control the motor that drives the axis provided with the tool in such a way that the tool comes out of contact with the workpiece; and a communication unit for communication between the motor control units that transmits the abnormality detection signal outputted by the abnormality detection unit to the safety operation control unit.

2. The motor control device according to claim 1, wherein the abnormality detection unit is provided for the motor control unit that controls a direct drive motor or a linear motor.

3. The motor control device according to claim 1, wherein the motor control units is provided independently of a numerical control unit that generates a command for driving the axes of the machine tool in accordance with a machining program.

4. The motor control device according to claim 1,
wherein each of the plurality of motor control units is provided with an abnormality detection unit, and
wherein the safety operation control unit is configured to control the motor that drives the axis provided with the tool in such a way that the tool comes out of contact with the workpiece based on an earliest abnormality detection signal outputted by any of the plurality of abnormality detection units.

5. The motor control device according to claim 1, wherein each abnormality detection unit comprises:
a load estimation unit that estimates a load on the motor controlled by the motor control unit provided with the abnormality detection unit;
an abnormality determination unit that determines that an abnormality has occurred with respect to the axis driven by the motor controlled by the motor control unit provided with the abnormality detection unit when the load estimated by the load estimation unit exceeds a certain threshold value; and
a signal output unit that outputs an abnormality detection signal when the abnormality determination unit determines that an abnormality has occurred.

* * * * *